United States Patent [19]

Oka

[11] Patent Number: 4,939,777

[45] Date of Patent: Jul. 3, 1990

[54] TERMINAL APPARATUS HAVING A FUNCTION FOR PREVENTING UNNECESSARY LINE CONNECTION

[75] Inventor: Tosho Oka, Hino, Japan

[73] Assignee: Kabushiki Kaisha Toshiba, Kawasaki, Japan

[21] Appl. No.: 323,929

[22] Filed: Mar. 15, 1989

[30] Foreign Application Priority Data

Mar. 16, 1988 [JP] Japan .................................. 63-60255

[51] Int. Cl.$^5$ ....................... H04M 1/00; H04M 11/00
[52] U.S. Cl. ........................................ 379/387; 379/93; 379/442
[58] Field of Search ................ 379/355, 387, 388, 422, 379/424, 100, 93, 96, 97, 98

[56] References Cited

U.S. PATENT DOCUMENTS

| | | | |
|---|---|---|---|
| 4,506,112 | 3/1985 | Bitsch | 379/424 |
| 4,741,021 | 4/1988 | Kotani et al. | 379/355 |
| 4,764,951 | 8/1988 | Kotani et al. | 379/355 |
| 4,807,278 | 2/1989 | Ross | 379/184 |
| 4,825,461 | 4/1989 | Kurita et al. | 379/93 |

*Primary Examiner*—Jin F. Ng
*Assistant Examiner*—Magdy Shehata
*Attorney, Agent, or Firm*—Finnegan, Henderson, Farabow, Garrett, and Dunner

[57] ABSTRACT

Terminal apparatus is disclosed which alternatively connects a data terminal apparatus by a first switching unit to a line. The terminal apparatus includes a telephone, on-hook transmit circuit, and second switching unit for connecting the telephone set and on-hook transmit circuit alternatively to the line via the first switching unit. The on-hook transmit circuit includes a unit responsive to an on-hook transmit operation to switch the second switching unit to an on-hook transmit circuit, unit responsive to a dial signal transmit operation to transmit the dial signal to the line, direct current closing unit which continues to be connected to the line with the second switching unit switched to the on-hook transmit circuit, line release detection unit and control unit. The line release detection unit generates a line release detection signal when the line release detection unit detects the line as being released. Upon the generation of the line release detection signal, the control unit supplies a switching control signal to the second switching unit to switch the second switching unit from an on-hook transmit circuit to a telephone set.

9 Claims, 4 Drawing Sheets

TERMINAL APPARATUS HAVING A FUNCTION FOR PREVENTING UNNECESSARY LINE CONNECTION

Background of the Invention

1. Field of the Invention

The present invention relates to an on-hook function-equipped terminal apparatus, such as a telephone set, which is connected to a "wire" line.

2. Description of the Related Art

A wire terminal apparatus, in addition to a telephone set, an on-hook transmit circuit and switching circuit. The switching circuit being adapted to connect the telephone set and on-hook transmit circuit alternatively to a wire line, such as a subscriber telephone line. The on-hook transmit circuit includes a direct current closing circuit for providing a direct current on the wire line and loud speaker circuit for monitoring a signal on a wire telephone line. When an operator turns off the on-hook transmit switch in a "terminating" wait state, the on-hook transmit circuit is connected by the switching circuit to the wire line in place of the telephone set, thereby closing a DC loop for the wire line. That is, the wire line is "connected", meaning that a DC loop is established in that "connected" state. The loud speaker circuit is connected to the wire line and a signal tone coming from exchange equipment over the wire line is output from a speaker in the loud speaker circuit. The operator confirms a "connected" state upon receipt of the signal tone and performs a dial key operation so that a dial signal for a communication party is sent to the exchange equipment. In use, the operator can make a call to a party on the other end of the line in the off-hook state without picking up the handset of the telephone. All that can be done on the part of the operator is to confirm a signal tone or sound coming from the speaker in the loud speaker circuit and pick up the hand set. It is, therefore, possible to make a call in a very simple way.

A data terminal apparatus, such as a facsimile apparatus, may also be connected to the wire line. A prior attempt to connect the data terminal apparatus, together with a wire terminal apparatus having the on-hook transmit function, to the data terminal apparatus has been made. For instance, upon making a call on the data terminal, the wire terminal apparatus is first connected by the switching circuit to the wire line and a call is made to a communication party, using an on-hook transmit feature. After confirming a response from the communication party, the wire line is switched by the switching circuit to the data terminal apparatus, thereby allowing data communication. Therefore, it is possible to implement either a personal communication or a data communication over a single wire line. It is also possible to use a data terminal apparatus which is not equipped with any call-initiating function.

However, the following disadvantage has been encountered in the conventional wire terminal apparatus. The wire terminal apparatus and major portion of the data terminal apparatus are connected alternatively to the wire line by a switching circuit within the data terminal apparatus. Furthermore, the telephone set and on-hook transmit circuit in the wire terminal apparatus are connected alternatively to the wire line by the switching circuit in the wire terminal apparatus. In the "terminating" wait state, the switching circuit in the data terminal apparatus is switched to the wire terminal apparatus and the switching circuit of the wire terminal apparatus is switched to the telephone set. That is, in the "terminating" wait state, the telephone set of the wire terminal apparatus is connected to the wire line.

For example, suppose that the on-hook transmit feature is used and data communication is carried out on the data terminal apparatus. Then, the operator operates the on-hook transmit switch on the wire terminal apparatus. When this is done, the switching circuit is switched from the telephone set to the on-hook transmit circuit, causing the wire line to be "connected". Upon the operation of the dial key in this state, a dial signal is generated from the on-hook transmit circuit and delivered to the exchange equipment via the wire line. By so doing, the data terminal apparatus of the communication party is called and, if the communication party responds to that call, then a signal tone or speech coming from the communication party's terminal is output from the speaker, thus enabling the operator to confirm the response by the party on the other end of the line. Upon the subsequent operation of the communication switch of the data terminal apparatus by the operator, the switching circuit of the data terminal apparatus is switched from the wire terminal apparatus to the major portion of the data terminal apparatus. The major portion of the data terminal apparatus is thereby coupled to the wire line, enabling a data communication to be carried out between the data terminal apparatus and the communication terminal. Upon the completion of a data communication, the switching circuit of the data terminal apparatus is switched from the major portion of the data terminal apparatus to the wire terminal apparatus, thus placing the data terminal apparatus in the "terminating" wait state.

In the conventional wire terminal apparatus when the data communication is carried out using the data terminal apparatus after a call has been made by the on-hook transmit circuit, the switching circuit of the wire terminal apparatus is switched to the on-hook transmit circuit even if the data terminal apparatus is returned back to the "terminating" wait state. Therefore, the wire circuit is still placed in the "connected" state by the DC closing circuit in the on-hook transmit circuit and the wire line is in an "engaged" state on the side of the exchange equipment. For this reason, even if, in this state, any call was given to the wire line by another telephone set or communication terminal, communication was not possible because the other telephone set or communication terminal would receive a "busy signal". In order to avoid such a situation, the operator must always perform an on-hook transmit releasing operation when the data terminal apparatus is returned to the "terminating" wait state, whereby it is necessary to return the switching circuit back to the telephone set. However, the operation is cumbersome and sometimes forgotten on the part of the operator.

SUMMARY OF THE INVENTION

It is accordingly the object of the present invention to provide an on-hook transmit function-equipped terminal apparatus which, even if a data communication is carried out subsequent to the operation of an on-hook transmit mode, can avoid any unnecessary "connected" state with the wire line, removing a burden on the operator.

In order to achieve the object of the present invention, a terminal apparatus with an on-hook transmit function is provided which connects a data terminal apparatus, via first switching means, alternatively to a line and includes second switching means for connecting a telephone set, on-hook transmit circuit and second switching means for connecting the telephone set and on-hook transmit circuit alternatively to the line via the first switching means. The on-hook transmit circuit comprises means responsive to an on-hook transmit operation for switching the second switching means to an on-hook transmit circuit, means responsive to a dial signal transmit operation for transmitting a dial signal to the line, direct current closing means which continues to allow the line to be "connected" with the second switching means switched to an on-hook transmit circuit, circuit release detection means and control means. The line release detection circuit detects a "released" state of the line to generate a line release detection signal. Upon the generation of the line release detection signal the control means delivers a switching control signal to the second switching means. The second switching means is switched from the on-hook transmit to a telephone set.

In the equipment thus arranged, when the line is switched by the first switching means to the data terminal apparatus subsequent to performing an on-hook transmission by the on-hook transmit circuit, the second switching means is separated from the on-hook transmit circuit and telephone set, releasing the line relative to the on-hook transmit circuit and telephone set. Therefore, the line release detection means generates a line release detection signal. The second switching means is responsive to the line release detection signal to switch from the on-hook transmit circuit to the telephone set. That is, upon the transfer of a data communication after the completion of the on-hook transmission, the second switching means is automatically returned from the on-hook transmit circuit to the telephone set.

Thus the situation under which, in spite of a "terminating" wait state being regained subsequent to completing the data communication of the data terminal apparatus, the line unnecessarily still continues to be "connected" by the direct current closing means in the on-hook transmit circuit is positively avoided according to the embodiment of the present invention. In the case where subsequent to the completion of the data communication, a call request is made from another line to a line to which the data terminal apparatus and telephone set are connected, a connection is established between both the lines without encountering any "engaged" state. It is, therefore, possible to effectively utilize the line to which the aforementioned telephone set and data terminal apparatus are connected. Thus the present invention obviates the need for performing any operation after the on-hook transmit circuit has been energized, which alleviates the operator's burden.

DETAILED DESCRIPTION OF THE PREFERRED EMBODIMENTS

A terminal apparatus with an on-hook transmission function, according to one embodiment of the present invention, will be explained below in more detail with reference to the accompanying drawings. In this embodiment, the terminal apparatus with the on-hook transmission function will be explained below as a telephone terminal apparatus.

Figure 1:
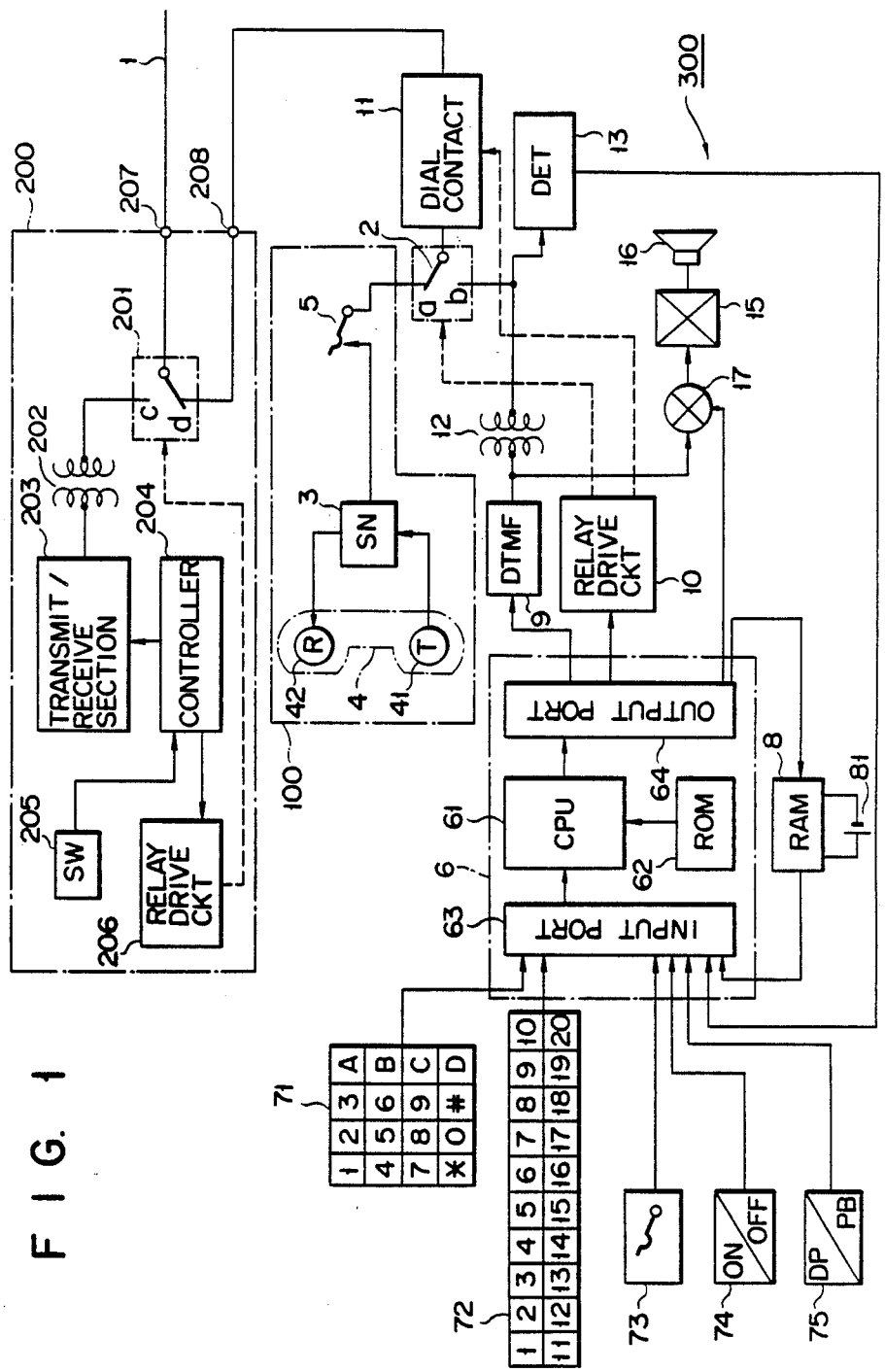
FIG. 1 is a block diagram showing an arrangement of a terminal apparatus with an on-hook transmit function according to one embodiment of the present invention.

The arrangement of the telephone terminal apparatus will be explained below by referring to FIG. 1. The telephone terminal apparatus comprises a telephone set 100, an auto-dialing apparatus 300 and a switching relay contact 2. The switching relay contact 2 is driven by a relay drive circuit 10 as set forth below. The telephone set 100 is selected with the switching relay contact 2 thrown on side a and auto-dialing apparatus 300 is selected with the switching relay contact thrown on a side b. The telephone set 100 and auto-dialing apparatus 300 are connected to a subscriber line 1 via a dial contact 11 and relay switch 201 of a facsimile apparatus 200, depending upon the selected states of the switching relay contact 2.

The telephone set 100 comprises a speaking network 3, a handset 4 having a transmitter 41 and receiver 42, and a hook switch 5 responsive to the hook operation of the handset 4. With the hook switch 5 closed, the speaking network 3 supplies a signal which is sent via the subscriber telephone line 1 from an exchange equipment or a talking party, as an audible tone to the receiver 42 in the handset 4. The speaking network 3 sends a speech signal, which is converted by the transmitter 41 in the handset 4 to an electric signal, to the subscriber telephone line 1 via the hook switch 5.

The auto-dialing apparatus 300 includes a control circuit 6 which comprises a microprocessor (CPU) 61, ROM 62 having an operation program stored therein, input port 63 and output port 64. To the input port 63 are connected a dial key array 71, subscriber select key array 72, hook contact 73, on-hook transmit switch 74 and dial mode change-over switch 75. The dial key array 71 includes numeral keys 0 to 9 and functional keys *, # and A to D. Upon the depression of a key, the dial key array 71 delivers a corresponding key code to the input port 63. The subscriber select key array 72 includes numeral keys 1 to 20. The subscriber select key array 72, upon the depression of a key, sends a corresponding key code to the input port 63. The hook contact 73 is responsive to the ON-OFF operation of the hook switch 5 of the telephone set 100 to generate a hook signal. The on-hook transmit switch 74 is comprised of, for example, a rocker type switch for generating a signal for starting an on-hook transmit operation upon being depressed once, and a signal for ending an on-hook transmit operation upon being depressed again with the preceding state. The dial mode change-over switch 75 is comprised of a rocker type switch for generating a signal for designating a dial pulse mode, upon being depressed once, and a signal for designating a DTMF signal mode, upon being depressed again with the preceding state.

To the output port 64 are connected a DTMF signal generator circuit 9, relay drive circuit 10 and mute output circuit 17 at their respective control terminals. Upon being supplied with a drive signal corresponding to a dial number from CPU 61 via the output port 64, the DTMF signal generator circuit 9 generates a DTMF (Dual Tone Multifrequency) corresponding to the aforementioned dial number. The DTMF signal output terminal of the DTMF signal generator 9 is connected via a transformer 12, switching relay contact 2 and dial contact 11 and then via the relay switch 201 in the facsimile apparatus 200 to the subscriber telephone line 1. The line transformer 12 is DC coupled to the subscriber telephone line 1 when the auto-dialing apparatus 300 is connected to the subscriber telephone line 1, which form a DC loop for the subscriber telephone line 1. The dial contact 1 sends a dialing pulse to the exchange equipment, not shown, by interrupting the DC loop for the subscriber telephone line 1. The dial contact 11 is driven by the relay drive circuit 10.

To the primary winding of the aforementioned line transformer an amplifier 15 is connected via the mute circuit 17. The amplifier 15 is connected to a speaker 16. The mute circuit 17, amplifier 15 and speaker 16 constitute a loud speaker circuit. With the auto-dialing apparatus 300 connected to the subscriber telephone line 1, the loud speaker circuit allows a signal which is sent from the exchange equipment or the party terminal via the subscriber telephone line 1 to be amplified by the amplifier 15 so that the signal is output as an audible tone to the speaker 16. The mute circuit 17 is rendered nonconductive upon being supplied with a mute signal from the CPU 61 and conductive upon being supplied with a mute release signal.

The line release detector circuit (DET) 13 is connected to the secondary winding of the line transformer 12. The line release detector circuit 13 generates a line release detection signal when the DC loop for the subscriber telephone line 1 is released. The line release detection signal is supplied via the input port 63 to the CPU 61. The line release detector circuit 13 comprises a current detector for detecting the presence or absence of a loop current, for example, in the subscriber telephone line 1.

A RAM 8 is connected between the input port 63 and the output port 64 and functions as a dial information memory. The memory section of the RAM 8 is divided into memory areas corresponding to the respective keys in the subscriber select key array 72. The dial numbers of the communication parties are stored in the corresponding memory areas. Reference numeral 81 denotes a back-up power source of a RAM 8.

The control circuit 6 has, as control functions for on-hook reception, a dial registration control function, dial tone transmit control function, on-hook receive control function, and a circuit line switching control function. These control functions are implemented by running a control program, by the CPU 61, which is stored in a ROM 62.

The dial registration control function is performed when a dial registration mode is designated by a registration mode designation switch. The control procedure is set, for example, in a way as set forth below. The CPU 61 first monitors the key operation of the dial key array 71. The key code which is output for each depression of a key in the dial key array 71 is input via the input port 63 to the CPU 61 where it is temporarily stored as dial number information in a corresponding register in the CPU 61. The CPU 61 monitors the operation of the subscriber select key array 72 and receives from the subscriber select key array 72 a key code which represents the subscriber select number. The CPU 61 gains access to that memory area of memory areas in the RAM 8 corresponding to the key code of the subscriber select number and stores the aforementioned dial number information in the memory area.

The on-hook transmit control function operates upon the operation of the on-hook receive switch 74. The control procedure is as set forth above. That is, upon being supplied with an on-hook receive starting signal from the on-hook transmit switch 74 the CPU 61 supplies a switching control signal for switching the switching relay contact 2 from the side a to the side b to the relay drive circuit 10. Upon being supplied with an on-hook transmit ending signal from the aforementioned on-hook transmit switch 74, CPU 61 supplies a switching control signal for returning the switching relay contact 2 from the side b to the side a to the relay drive circuit 10. When the telephone set 100 is set from the off-hook state to the on-hook state and on-hook signal is input from the hook contact 73, CPU 61 delivers a switching control signal for returning the switching relay contact 2 from the side b to the side a to the relay drive circuit 10.

The dial tone transmit control function operates when a key on the dial key array 71 or on the subscriber select key array 72 is operated in on-hook transmit mode. That is, upon being supplied with an output signal from the dial mode change-over switch 75 the CPU 61 determines whether the dial mode is designated to a dial pulse mode or the DTMF signal. Then the CPU 61 determines whether the key on the dial key array 71 or on the subscriber select key array 72 is operated, and delivers a dial pulse or a DTMF signal in accordance with a result of determination. For example, if the result is determined as being the dial pulse mode and dial key on the dial key array 71 is operated, a drive signal for supplying the dial pulse corresponding to the key signal to the subscriber telephone line 1 is fed to the relay drive circuit 10 each time a key code signal corresponding to one digit is received from the dial key array 71. If, on the other hand, the result is determined as being the dial pulse mode and key on the subscriber select key array 72 is operated, then dial number information is read out of a memory area of the memory areas in the RAM 8 which corresponds to the key entered from the subscriber select key 72. A corresponding signal for delivering the dial pulse corresponding to the dial number information to the subscriber telephone line 1 is fed to the relay drive circuit 10. If the result is determined as being the DTMF mode and dial key 71 is operated, then for each entry of a key code signal of one digit from the key on the dial key array 71 the CPU 61 feeds a drive signal for sending the DTMF signal corresponding to the key code signal to the subscriber telephone line 1 to the DTMF signal generator circuit 9. If, on the other hand, the result is determined as being the DTMF signal mode and key on the subscriber select key array 72 is operated, then corresponding dial number information is read out of a memory area of the memory areas in the RAM 8 which corresponds to the key code entered from the key on the subscriber select key array 72. The CPU 61 delivers a drive signal for supplying the DTMF signal corresponding to the dial number information to the subscriber telephone line 1 to the DTMF signal generator circuit 9.

The circuit line switching control function is performed when a line release detection signal is supplied from the line release detector circuit 13 with the switching relay contact 2 thrown on the side b. That is, the CPU 61, upon being supplied with a line release detection signal, determines whether the dial pulse is "now being sent" or has been sent to a corresponding circuit. If the CPU 61 determines the dial pulse as "now being sent", then it nullifies the aforementioned line release detection signal. When, on the other hand, the CPU 61 determines the dial pulse as "having been sent" to the circuit, then it makes the line release detection circuit effective. The CPU 61 delivers a switching control signal for regaining the switching relay contact 2 from side b to side a to the relay drive circuit 10.

The facsimile apparatus 200, together with the telephone terminal apparatus, is connected to the subscriber telephone line 1. For convenience sake, the explanation is restricted only to those portions associated with the present invention.

The facsimile apparatus 200 includes the switching relay switch 201 with a movable contact connected to the subscriber telephone line 1 via a line connection line 201. The aforementioned telephone terminal device is connected via an external terminal connection terminal 208 to contact d of the relay switch 201. A transmit/receive section 203 is connected via a line transformer 202 to contact c of the relay switch 201 with the relay switch 201 thrown on contact c, the line transformer 202 is DC coupled to the subscriber telephone line 1 to provide a DC loop. The transmit/receive section 203 receives an image signal from the communication party's terminal via the subscriber telephone line 1 and sends it to an image recording section, not shown. The transmit/receive section 203 transmits a image signal which is output from an image read-out section, not shown, to the subscriber telephone line 1. Facsimile apparatus 200 has a controller section 204 including, for example, a microcomputer as a major section which performs various control functions associated with the facsimile communication. The controller section 204 is connected to a communication switch 205 and relay drive circuit 206. The communication switch 205 delivers a facsimile transmit/receive start instruction signal to the controller section 204. The controller section 204, upon being supplied with the instruction signal, delivers to the relay drive circuit 206 a switching control signal which, at a time of a "terminating" wait, is switched from contact d to contact c of the relay switch 201. Upon the completion of the facsimile communication the controller 204 delivers to the relay drive circuit 206 a switching control signal which returns the relay switch 201 from contact c to contact d.

The operation of the apparatus thus arranged will be explained below in a sequence of control by the control circuit.

Figure 2A:
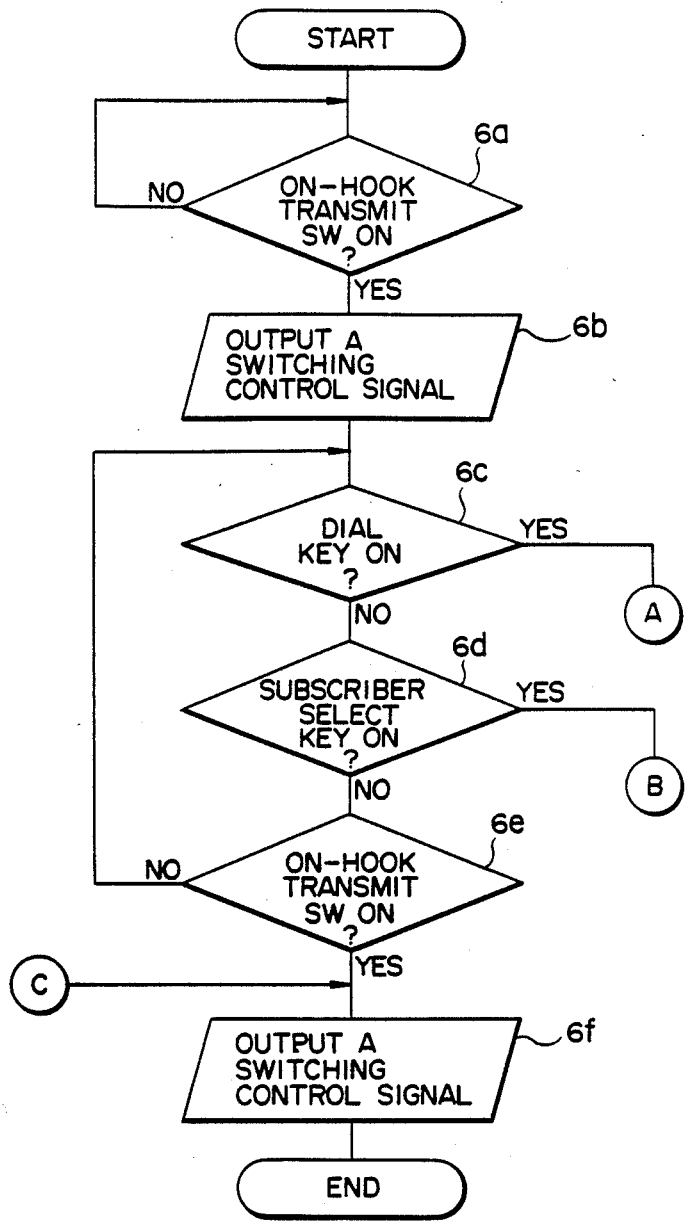
FIGS. 2A to 2C are flowcharts for explaining the operation of the terminal apparatus shown in FIG. 1.
Figure 2B:
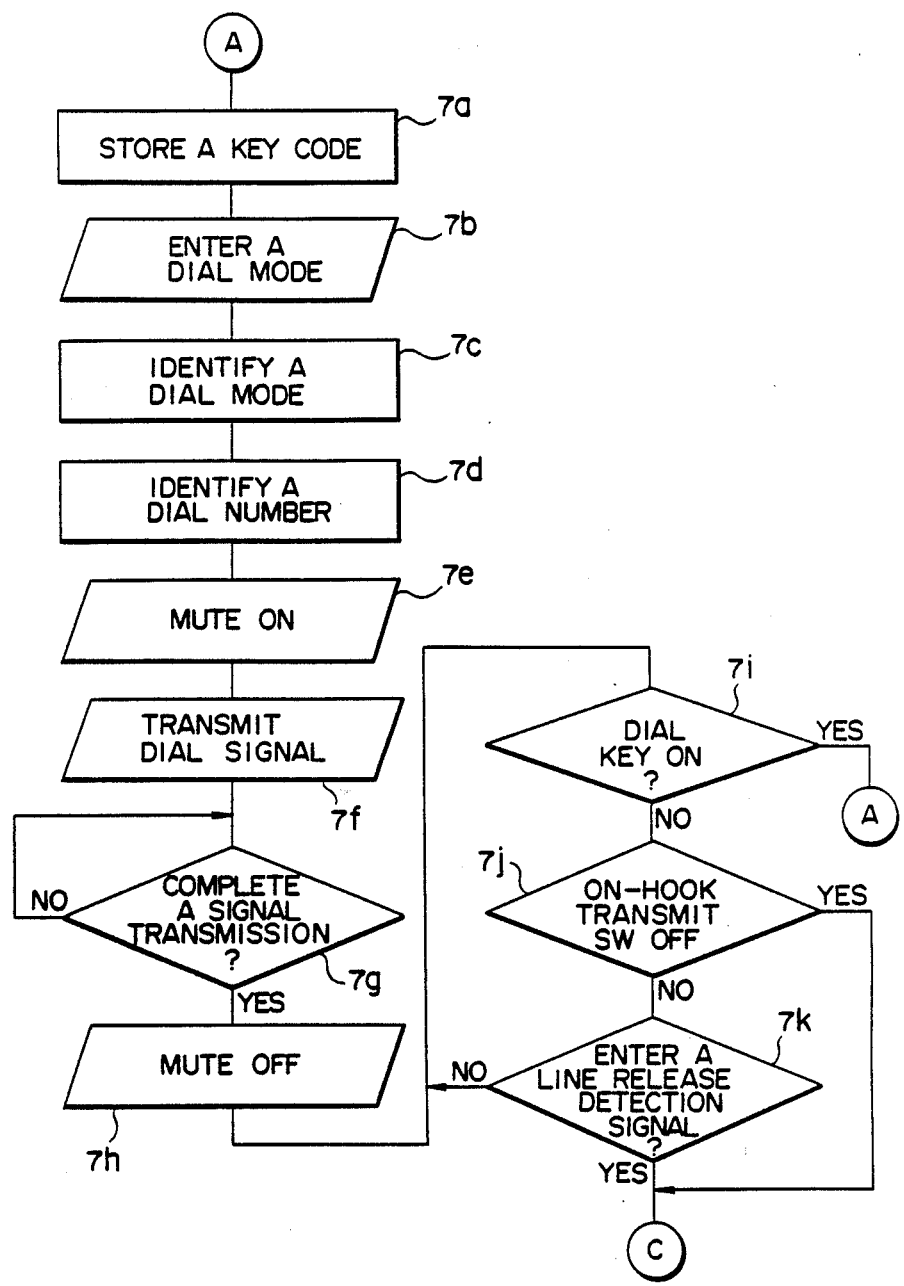
Figure 2C:
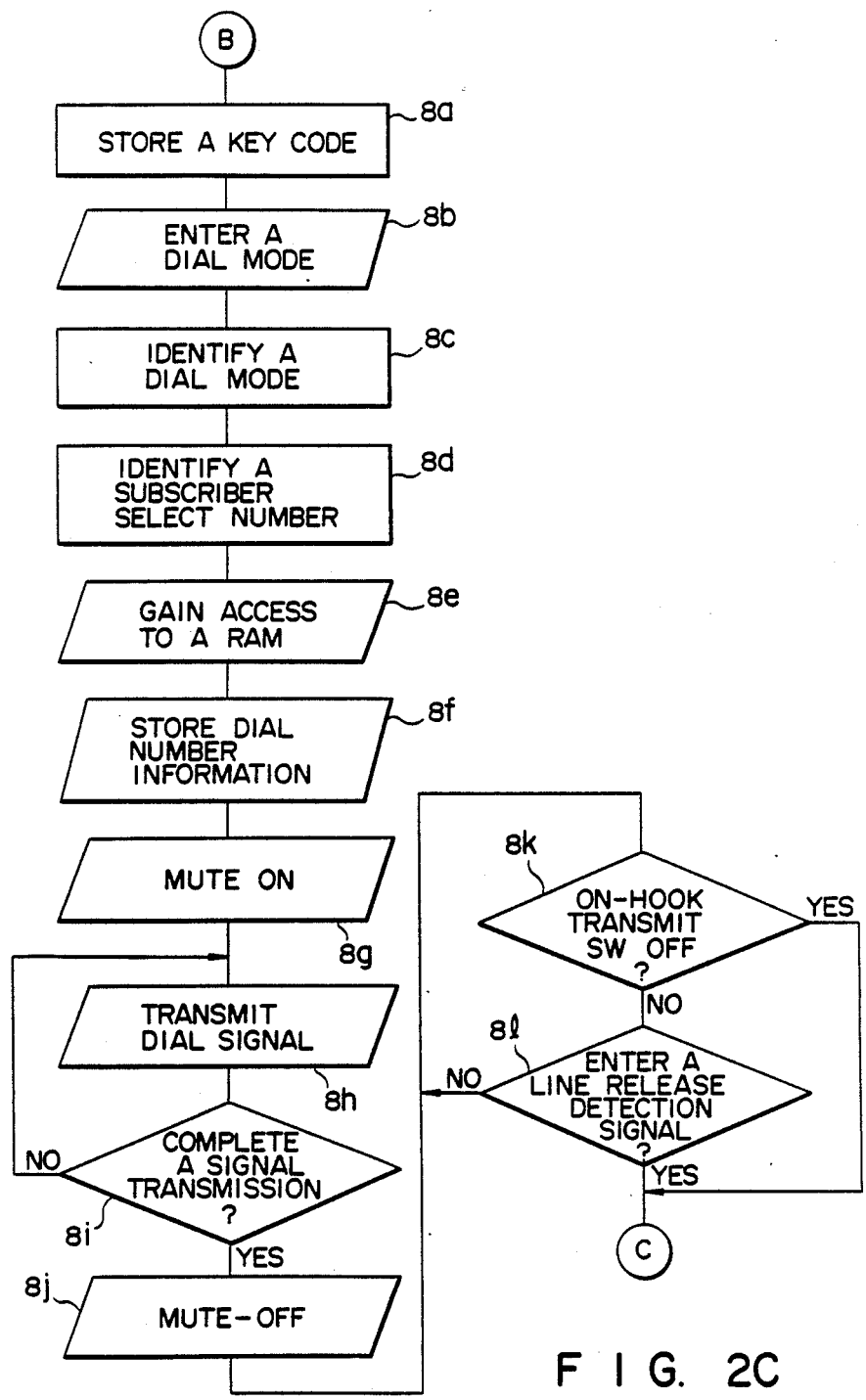

FIGS. 2A to 2C show a flowchart showing a control procedure which will be set forth below in more detail, assuming that the dial number of a desired communication party has already been stored in the RAM 8 and that dial pulse mode is designated as the dial mode.

In the "terminating" wait state, relay switch 201 in the facsimile apparatus 200 is set to the side d and switching relay contact 2 in the telephone terminal apparatus is set to side a. At this time, the telephone set 100 in the telephone terminal apparatus is connected to the subscriber telephone line 1. The CPU 61 performs step 6a repetitively and monitors whether or not the on-hook transmit switch 74 is operated.

Suppose that the operator depresses the on-hook "originating (calling)" switch 74 in the telephone terminal apparatus to allow him or her to make a call to a party's facsimile apparatus. Then an on-hook transmit starting signal is input to the CPU 61 via the input port 63 and CPU 61 recognizes that the on-hook transmit starting operation has been performed. Then the step 6b is implemented and CPU 61 delivers a switching control signal for starting an on-hook transmission to the relay drive circuit 10 via the output port 64. If this is done, the relay drive circuit 10 is driven to allow the switching relay contact 2 to be switched from contact a to contact b. As result, the auto-dialing apparatus 300 is connected to the subscriber telephone line 1 in place of the subscriber telephone set 100. In this state, the subscriber telephone set 100 is closed by the transformer 12 in the auto-dialing apparatus 300 to create a DC loop for the subscriber telephone line 1. That is, the auto-dialing apparatus is placed in the "transmitted" state. As a result, power is supplied from the power source circuit, not shown, to the loud speaker circuit, causing the latter to the placed in an active state. A signal, such as a dial tone, which is sent from the exchange equipment via the subscriber telephone line 1 is, after being amplified by the amplifier 15, delivered as an audible tone from the speaker 16.

In this state, the CPU 61 performs the steps 6c to 6e and inspects the presence or absence of the operation of a key on the dial key array 71 and on the subscriber select key array 72 as well as the presence or absence of the off operation by the on-hook transmit switch 74. If, in this state, the operator again depresses the on-hook transmit switch 74 in an attempt to interrupt, for example, the on-hook transmission, an on-hook transmit complete signal is delivered past the input port 63 to the CPU 61. The CPU 61 recognizes the presence of the on-hook transmit complete operation and implements the step 6f. At step 6f, the CPU 61 delivers a switching control signal for regaining the switching relay contact 2 to the relay drive circuit 10 via the output port 64 so that the switching relay contact 2 is returned from side b to side a. As a result, the auto-dialing apparatus 300 is separated from the subscriber telephone line 1, while the telephone set 100 is connected to the subscriber telephone line 1 so that the subscriber telephone line 1 is returned to a "terminating" wait state.

Assume that in the aforementioned transmission state, a key on the dial key array 71 is operated in an attempt to enter the dial number of the communication party. Then a key code corresponding to the depressed key on the dial key array 71 is delivered via the input port 63 to the CPU 61. The key code is stored at step 7a in the corresponding register of the CPU 61 and CPU 61 receives an instruction signal from the dial mode switching key 75 at step 7b. At step 7c, the CPU 61 recognizes whether the dial mode is set to the dial pulse mode or to the DTMF signal mode. At step 7d, the CPU 61 recognizes the dial number from the key code which is stored in the register.

At steps 7e to 7i, the CPU 61 sends the dial signal. That is, at step 7e, a mute signal is supplied to the mute circuit 17, causing the latter to be rendered nonconductive so that a dial signal tone for the subscriber telephone line is not output from the speaker 16. Since the dial pulse mode is set as the dial mode, at step 7f the CPU 61 delivers a drive signal for delivering the dial pulse corresponding to the key code stored in the corresponding memory area to the relay drive circuit 10. As a result, the DC loop for the subscriber telephone line 1 is interruptedly cut off by the dial contact 11, allowing the dial pulse corresponding to a first-digit dial number to be sent to the exchange equipment. During the transport of the dial pulse, the CPU 61 confirms at its own timer at step 7g whether or not the transport of the first-digit dial pulse has been completed.

Thereafter, the CPU 61 supplies a mute release signal at step 7h, causing the mute circuit 17 to be placed back to a conductive state to allow a signal tone which is sent from the exchange equipment to be output from the speaker 16. The steps 7i to 7k are carried out in a repetitive fashion and CPU 61 examiners whether or not the key on the dial key array 71 is operated. The on-hook transmit switch 74 is operated in the OFF mode and the line release detection signal is entered. If, in this state, the key on the dial key array 71 is depressed so that the second-digit dial number is entered, the corresponding key code is input via the input port 63 to the CPU 61. As a result, the control program is returned from the step 7i back to the step 7a. Then at steps 7a to 7e the storing of the key code, confirming of the dial mode, identifying of the dial number and setting of the mute state are implemented and the step 7f is carried out. That is, at step 7f, the CPU 61 delivers a relay drive signal for sending a dial pulse corresponding to the second-digit key code in the register to the relay drive circuit 10. Thus the DC loop for the subscriber telephone line 1 is cut off by the dial contact 11 and the dial pulse corresponding to the second-digit dial number is delivered to the exchange equipment. During the transport of the dial pulse, the CPU 61 determines at step 7g whether or not it has been transmitted to an associated circuit. If the answer is in the affirmative, the mute state of the mute circuit 17 is released at step 7h. Thereafter, for each depression of a key on the dial key array 71 the steps 7a to 7h are repeatedly carried out and hence the dial pulse corresponding to the respective dial number is sequentially delivered to the exchange equipment.

Assume that during the delivery of the dial pulse the operator is aware of the input error of, for example, a dial number and turns off the on-hook transmit switch 74 so that a "call" operation is interrupted. When this is done, the step 7j detects the completion of an on-hook transmit complete operation. At step 6f, the CPU 61 delivers a switching control signal for returning the switching relay contact 2 from side b back to side a and DC loop for the subscriber telephone line 1 is released, allowing the subscriber telephone line 1 to be in a "terminating" wait state.

Upon the operation of a key on the subscriber select key array 72 in the aforementioned transmitting state, the steps 8a to 8l are performed as shown in FIG. 2C. Now suppose that the operator depresses a key "1" on the subscriber select key array 72. Then the corresponding key code is introduced via the input port 63 into the CPU 61 where it is stored in its own register at step 8a. Then at step 8b the CPU 61 receives an instruction signal of the dial mode changeover switch 75 and, at step 8c, identifies its dial mode. The step 8d identifies the subscriber select number from the key code and step 8e gains access to a corresponding memory area in the RAM 8. The CPU 61 reads out the dial number information corresponding to the subscriber select number "1" from the RAM 8. The dial number information is comprised of, for example a 10 digit number and is stored, at step 8f, in the register in the CPU 61. The CPU 61 delivers a mute signal to the mute circuit at step 8g and controls the transport of the dial signal at step 8h. That is, the CPU 61 permits reading out the first-digit key code of the dial number information stored in the register in the CPU 61. Since the dial pulse mode is designated the CPU 61 delivers a relay drive signal for sending the dial pulse corresponding to the key code to the relay drive circuit 10. As a result, the dial contact 11 is energized to cut off the DC loop for the subscriber telephone line. The dial pulse corresponding to the first-digit key code is sent to the exchange equipment.

The CPU 61 returns the control in step 8h when it confirms the completion of the transport of the first-digit dial pulse. This time, a relay drive signal for sending a dial pulse, corresponding to the second-digit key code, of the dial number information in the register is delivered to the relay drive circuit 10. Therefore, the dial pulse corresponding to the second-digit key code is fed from the dial contact 11 to the exchange equipment. In the same way as set forth above, the dial pulses corresponding to the key codes of the remaining digits of the dial number information are delivered via the subscriber telephone line to the exchange equipment.

The CPU 61 monitors the transmission operation of the aforementioned dial pulse at step 8i. Upon confirming the transport of the dial pulses corresponding to all the digits of the dial number information by the aforementioned monitoring, the CPU 61 transfers control in step 8j at which it releases the mute state of the mute circuit 17. A repeated operation is executed at steps 8k and 8l. The steps 8k and 8l examiner the OFF operation of the on-hook transmit switch 74 and the entering of the circuit release detection signal, respectively, as at steps 7j and 7k. Suppose that, in this state, the operator is aware of an operation error of, for example, the subscriber select key 72 and turns off the on-hook transmit switch 74 so that the on-hook transmit mode is once interrupted. Then at step 8k the OFF operation is detected and at the step 6f a switching control signal for regaining the relay contact 2 is delivered to the relay drive circuit 10. As a result, the relay contact 2 is returned from the side a to the side a, releasing the DC loop for the subscriber telephone line 1.

Now suppose that a call is made by the exchange equipment to the subscriber's terminal upon the transmission of the dial pulse and a response is made to the call at the subscriber's terminal. Also suppose that the operator on the "caller" identifies a response signal coming from the communication party and operates the communication switch 205 on the facsimile apparatus 200. The controller section 204 detects the operation of the communication switch 205 and sends a relay drive signal for switching the relay switch 201 to the relay drive circuit 206. Therefore, the relay switch 201 on the facsimile apparatus 200 switches from contact d to contact c, resulting in the transmit/receive section 203 being coupled over the subscriber telephone line 1 to the terminal of the communication party. It is therefore possible to perform a facsimile communication across both the terminals.

When the relay contact 201 on the facsimile apparatus 200 is switched over to the transmit/receive section 203, the auto-dialing apparatus 300 is disconnected from the subscriber telephone line 1. A line release detection signal is output from the line release detection circuit 13 on the auto-dialing apparatus 300 at the time when the auto-dialing apparatus 300 is disconnected from the subscriber telephone line 1. The detection signal is input via the input port 63 to the CPU 61. At this time the CPU 61 monitors the arrival of the line release detection signal at step 7k or 8l. CPU 61 immediately detects the arrival of the line release detection signal and operation of the step 6f is carried out. At step 6f, the CPU 61 delivers a switching control signal for returning the relay contact 2 from side b back to side a. As a result, the auto-dialing apparatus 300 is disconnected from the subscriber telephone line 1 and telephone set 100 is connected to the subscriber telephone line 1 instead, thus placing the subscriber telephone line 1 in a "terminating" wait sate.

At the completion of the facsimile communication, and after the relay contact 201 has been returned from contact c back to the contact d, the subscriber telephone line 1 is coupled to the telephone set 100. The situation under which the DC loop for the subscriber telephone line 1 remains closed by the line transformer 12 on the auto-dialing apparatus 300 after the facsimile apparatus 200 has been returned to the "terminating" wait state, is positively avoided according to the embodiment of the present invention.

In the apparatus of the present invention, subsequent to the on-hook transmission by the auto-dialing apparatus 300, the subscriber telephone line 1 is switched over to the facsimile apparatus 200 and, upon the disconnection of the auto-dialing apparatus 300 from the subscriber telephone line 1, the line release detection circuit 13 delivers a line release detection signal. Therefore, the situation under which the subscriber telephone line 1 remains "connected" in spite of the fact that the facsimile communication has been finished can positively be avoided in the embodiment of the present invention. In the case where a call is made from another subscriber subsequent to the ending of the aforementioned facsimile communication, it is not brought to an "engaged" state and is, therefore, possible to make a rapid response to that call and hence to enhance an available traffic efficiency on the line. Since it is not necessary for the operator to turn off the on-hook transmit switch 74 subsequent to finishing the on-hook transmit operation, a burden of the operator can be relieved in the performance of the aforementioned operation. Furthermore, it is possible to positively avoid an unnecessary "connected" state on the subscriber line due to the operator's negligence.

In the embodiment of the present invention the CPU 61 can receive a line release detection signal from the line release detector circuit 13 subsequent to finishing the transmission of the dial pulse. For this reason there is no risk that a "break" on the subscriber telephone line 1 which may occur at the dial pulse transmit time will be detected as being a "release" on the line. It is thus possible always to automatically and accurately recover an on-hook transmit state.

In the embodiment of the present invention, when the CPU 61 detects that a DC loop for the subscriber telephone line 1 is released, the auto-dialing apparatus 300 independently switches the relay contact 2 from the auto-dialing apparatus (300) to the telephone set (100). Even if, therefore, there is a "temporary break" on the subscriber telephone line for some reason or other during the on-hook transmit operation, the subscriber telephone line 1 is positively and automatically returned back to the "terminating" wait state. That is, according to the apparatus of the present invention, if there is a "temporary release" on the subscriber telephone line 1 for another reason even when no facsimile apparatus is used, the relay contact can positively and accurately be returned back to the telephone set (100).

The present invention is not restricted to the aforementioned embodiment. For example, another means can be adopted which erroneously never detects a "temporary break" on the subscriber telephone line 1 at the dial pulse transmit time as being a "line release". That is, a delay circuit and integrating circuit may be provided on the detection signal path from the line release detector circuit 13 to the input port 63. In this case, a line release detection signal is delayed or integrated and conducted to the input port 63. Therefore, a line release detection signal is supplied to the input port 63 in the control circuit 6 only when the release state of the subscriber telephone line 1 continues for more than a predetermined period of time. It is, therefore, possible to avoid the situation under which, due to "temporary break" on the subscriber telephone line 1 resulting from the transmission of a dial pulse, the relay contact 2 is switched from the auto-dialing apparatus (300) to the telephone set (100).

Although the embodiment of the present invention has been explained above as being the apparatus having the telephone set and auto-dialing apparatus as the on-hook transmit circuit, it may have only the on-hook transmit circuit instead or have, in addition to the on-hook transmit circuit, the telephone set and data terminal apparatus. Although the embodiment of the present invention has been explained as having the line release detector circuit provided in the auto-dialing apparatus, the line release detector circuit may independently be provided outside the on-hook transmit circuit or within the telephone set. In the embodiment of the present invention, the control under which the relay contact 2 is switched in accordance with the line release detection signal is implemented by the control circuit 6 in the auto-dialing apparatus 300, but such control may be made by its own control circuit which is provided independently of the control circuit 6. The arrangement and function of the on-hook transmit circuit, arrangement of the switching means, arrangement of the line release detecting means and arrangement and control sequence of the control means, as well as the kinds of the data terminal apparatus may be changed or modified without departing from the spirit and scope of the present invention.

What is claimed is:

1. A terminal apparatus alternatively connected to a line with data terminal apparatus by first switching means, comprising:
   a telephone set responsive to an operation for a call to generate a call signal;
   an on-hook transmit circuit; and
   second switching means for alternatively connecting the telephone set and on-hook transmit circuit to said line via the first switching means; wherein said on-hook transmit circuit includes:
   means, responsive to an on-hook transmit operation, for supplying a first switching control signal to the second switching means to connect the second switching means to an on-hook transmit circuit,
   means, responsive to a dial signal transmit operation, for transmitting a dial signal to the line,
   direct current closing means for maintaining the line in a connected condition with the second switching means switched to the on-hook transmit circuit,
   line release detection means for generating a line release detection signal with the line released, and
   control means, responsive to the line release detection signal, for supplying a second switching control signal to the second switching means to switch the second switching means from the on-hook transmit circuit to the telephone set.

2. Terminal apparatus according to claim 1, wherein said control means includes:
   determining means for determining the completion of a dial signal transmission, and supplying means for supplying the second switching control signal to the second switching means to switch the second switching means from the on-hook transmit circuit to the telephone set, when said determining means determines the completion of the dial signal transmission and line release detection signal is generated from said line release detection means.

3. Terminal apparatus according to claim 1, wherein said line release detection means generates the line release detection signal when the line continues released for more than a predetermined period of time.

4. Terminal apparatus according to claim 1, wherein said on-hook transmit circuit includes
means, responsive to an operation for completing an on-hook transmit operation, for generating a third switching control signal, and
control means, responsive to the third switching control signal and said line release detection signal, for supplying the second switching control signal to said second switching means to switch said second switching means from an on-hook transmit circuit to a telephone set.

5. Terminal apparatus alternatively connected to a line with a data terminal apparatus by first switching means, comprising:
an on-hook transmit circuit;
second switching means for connecting the on-hook transmit circuit and communication circuit for communication, alternatively, to the line via the first switching means; wherein
said on-hook transmit circuit includes:
means, responsive to an on-hook transmit operation, for supplying a first switching control signal to the second switching means to switch the second switching means to an on-hook transmit circuit,
means responsive to a dial signal transmit operation to transmit a dial signal to the line,
direct current closing means for maintaining the line in a connected condition with the second switching means switched to the on-hook transmit circuit,
line release detection signal means for generating a line release detection signal when said line is in a released state, and
control means, responsive to said line release detection signal, for supplying a second switching control signal to the second switching means to switch the second switching means from the on-hook transmit circuit side to a communication circuit.

6. Terminal apparatus comprising:
a data terminal apparatus for performing a data communication in accordance with a data communication starting instruction and for generating a data communication complete signal when the data communication is completed;
a telephone set, responsive to an operation for communication, for generating a communication signal;
first switching means connected alternatively to the data terminal apparatus and telephone set and responsive to the data communication starting instruction to make a switching from a telephone set to a data terminal apparatus and responsive to the data communication complete signal to effect a return from the data terminal apparatus back to the telephone set,
an on-hook circuit, and
second switching means for connecting the telephone set and on-hook transmit circuit alternatively to the line via the first switching means; wherein
said on-hook transmit circuit includes:
means, responsive to an on-hook transmit operation, for supplying a first switching control signal to the second switching means to switch the second switching means to an on-hook transmit circuit,
means responsive to a dial signal transmit operation to transmit a dial signal to the line,
direct current closing means which continues to be connected with the second switching means switched on the on-hook transmit circuit,
line release detection means for generating a line release detection signal when the line is in a released state, and
control means, responsive to the line release detection signal, for supplying a second switching control signal to the second switching means to switch the second switching means from the on-hook transmit circuit to the telephone set.

7. Terminal apparatus comprising:
a communication circuit for transmitting and receiving a communication signal;
an on-hook transmit circuit, responsive to an on-hook transmit operation, for performing an on-hook transmit operation and responsive to an on-hook transmit complete signal for completing an on-hook transmit operation;
switching means for connecting the communication circuit and on-hook transmit circuit alternatively to a line;
a line release detection means for generating a line release detection signal when the line is in a released state; and
control means for detecting whether the switching means is switched to an on-hook transmit circuit or to a communication circuit and for supplying a switching control signal to the switching means, when the switching means is switched to the on-hook transmit circuit and line release detection signal is generated, to switch the switching means from the on-hook transmit circuit to the communication circuit.

8. Terminal apparatus according to claim 7, wherein said control means includes:
determining means for determining the completion of a dial signal transmission, and
means for supplying a switching control transmission is completed by said determining means and line release detection signal is generated from the line release detection means, to switch the switching means from the on-hook transmit circuit to said communication circuit.

9. Terminal apparatus according to claim 7, wherein said circuit release detection means generates a line release detection signal when the line is released for more than a predetermined period of time.

* * * * *